US010314315B2

(12) United States Patent
Hegge et al.

(10) Patent No.: US 10,314,315 B2
(45) Date of Patent: Jun. 11, 2019

(54) CONVECTION OVEN WITH LINEAR COUNTER-FLOW HEAT EXCHANGER

(71) Applicant: LBC Bakery Equipment, Inc., Everett, WA (US)

(72) Inventors: Stephen B. Hegge, Everett, WA (US); Daniel Lee Gilbert, Lake Stevens, WA (US); Thomas E. Depner, Stanwood, WA (US)

(73) Assignee: LBC BAKERY EQUIPMENT, INC., Everett, WA (US)

( * ) Notice: Subject to any disclaimer, the term of this patent is extended or adjusted under 35 U.S.C. 154(b) by 568 days.

(21) Appl. No.: 15/012,710

(22) Filed: Feb. 1, 2016

(65) Prior Publication Data

US 2016/0219888 A1 Aug. 4, 2016

Related U.S. Application Data

(60) Provisional application No. 62/111,577, filed on Feb. 3, 2015.

(51) Int. Cl.
*A21B 1/26* (2006.01)
*A21B 1/44* (2006.01)
*A21B 3/04* (2006.01)

(52) U.S. Cl.
CPC ............. *A21B 1/26* (2013.01); *A21B 1/44* (2013.01); *A21B 3/04* (2013.01)

(58) Field of Classification Search
CPC .... A21B 1/00; A21B 1/02; A21B 1/04; A21B 1/06; A21B 1/08; A21B 1/10; A21B 1/14;
(Continued)

(56) References Cited

U.S. PATENT DOCUMENTS 11,661 A * 9/1854 Carpenter ............. F28F 9/0212
    165/176
99,573 A * 2/1870 Johnson .................... F28F 9/22
    165/160

(Continued)

FOREIGN PATENT DOCUMENTS

WO    WO 9749962 A1 * 12/1997 ........... F28D 7/0041
WO    2014075975 A1    5/2014

OTHER PUBLICATIONS

WO 9749962 A1—English machine translation.*
(Continued)

*Primary Examiner* — Jorge A Pereiro
(74) *Attorney, Agent, or Firm* — Davis Wright Tremaine LLP; George C. Rondeau, Jr.

(57) ABSTRACT

A convection oven includes a cooking chamber for cooking a food product, an air circulator that circulates process air in a first direction through the cooking chamber and along a circulation path in a circulation passage. A heat exchanger includes one or more heat transfer ducts longitudinally arranged along the circulation path. One or more heating elements heat a fluid that is circulated in a second direction through the one or more heat transfer ducts which is opposite to the first direction. The process air absorbs heat from the heated fluid as the process air travels along the circulation path back to the cooking chamber. A partition wall may separate first and second parallel portions of the one or more heat transfer ducts. A heat exchanger may preheat fluid entering the one or more heat transfer ducts using heated fluid leaving the heat transfer ducts.

34 Claims, 9 Drawing Sheets

(58) Field of Classification Search
CPC .. A21B 1/145; A21B 1/26; A21B 1/28; A21B 1/44; A21B 1/40; A21B 1/50; A21B 3/04
USPC .................................. 165/138, 157, 154, 164
See application file for complete search history.

(56) References Cited

U.S. PATENT DOCUMENTS

| | | | | | |
|---|---|---|---|---|---|
| 298,202 | A | * | 5/1884 | Hayes | F28F 9/22 165/160 |
| 1,830,008 | A | * | 11/1931 | Tuck | 126/116 R |
| 1,891,981 | A | * | 12/1932 | Herbst | F26B 9/06 165/108 |
| 2,062,025 | A | * | 11/1936 | Harrington | C02F 1/048 110/228 |
| 2,376,171 | A | * | 5/1945 | Mueller | F24H 3/065 126/110 R |
| 2,854,220 | A | * | 9/1958 | Vaughan | F22B 31/08 165/104.31 |
| 3,183,969 | A | * | 5/1965 | Bell | F22B 1/1823 165/160 |
| 3,357,407 | A | * | 12/1967 | Fanaritis | E21B 43/24 122/1 R |
| 3,566,502 | A | * | 3/1971 | Pasqualini | F28B 1/02 165/140 |
| 3,641,945 | A | | 2/1972 | Tillander et al. | |
| 3,670,668 | A | * | 6/1972 | Phillips | F23G 7/06 110/212 |
| 3,706,445 | A | * | 12/1972 | Gentry | F26B 23/022 110/212 |
| 3,949,053 | A | * | 4/1976 | Gentry | B01D 53/34 422/173 |
| 4,060,371 | A | * | 11/1977 | Gentry | B01D 53/34 431/215 |
| 4,330,035 | A | * | 5/1982 | Hillerstro | F28D 7/08 165/154 |
| 4,612,981 | A | * | 9/1986 | Palz | F28F 21/04 165/158 |
| 4,648,355 | A | * | 3/1987 | Bekedam | F22D 1/18 122/412 |
| 4,785,151 | A | | 11/1988 | Voegtlin | |
| 4,809,774 | A | * | 3/1989 | Hagemeister | F28D 7/08 165/163 |
| 4,860,725 | A | * | 8/1989 | Tallman | F24H 3/087 126/110 R |
| 4,892,083 | A | | 1/1990 | Konig | |
| 5,094,224 | A | * | 3/1992 | Diesch | F28F 1/42 126/110 R |
| 5,129,384 | A | | 7/1992 | Parks | |
| 5,195,502 | A | * | 3/1993 | Hanning | F24H 1/206 122/18.3 |
| 5,228,385 | A | | 7/1993 | Friedrich et al. | |
| 5,295,473 | A | * | 3/1994 | Neufeldt | F24H 3/105 126/103 |
| 5,385,137 | A | * | 1/1995 | Christensen | A21B 1/02 126/21 A |
| 5,394,791 | A | | 3/1995 | Vallee | |
| 5,441,405 | A | * | 8/1995 | Bedford | F23D 14/045 126/110 C |
| 5,588,830 | A | | 12/1996 | Josefsson et al. | |
| 5,601,013 | A | | 2/1997 | Larsson et al. | |
| 5,617,839 | A | | 4/1997 | Jennings et al. | |
| 5,653,164 | A | | 8/1997 | Vallee | |
| 6,044,833 | A | | 4/2000 | Gebhardt et al. | |
| 6,516,712 | B1 | * | 2/2003 | Ratermann | A21B 1/26 126/20 |
| 6,837,234 | B2 | | 1/2005 | Rabas et al. | |
| 6,854,456 | B1 | | 2/2005 | Friedrich et al. | |
| 6,854,457 | B2 | | 2/2005 | Rabas et al. | |
| 6,880,544 | B2 | | 4/2005 | Hegge et al. | |
| 6,909,069 | B2 | | 6/2005 | Kerler et al. | |
| 7,285,756 | B2 | | 10/2007 | Leppich | |
| 7,297,904 | B2 | | 11/2007 | Paller | |
| 7,527,051 | B2 | | 5/2009 | Schmitz | |
| 8,381,715 | B2 | * | 2/2013 | Vancak | F23C 3/002 126/104 A |
| 9,719,733 | B2 | * | 8/2017 | Yang | F28F 1/003 |
| 2003/0205222 | A1 | | 11/2003 | Rabas et al. | |
| 2004/0107953 | A1 | * | 6/2004 | Hegge | A21B 1/26 126/21 A |
| 2005/0092314 | A1 | | 5/2005 | Rabas et al. | |
| 2005/0147400 | A1 | * | 7/2005 | Logan | F24F 1/0007 392/360 |
| 2006/0108433 | A1 | | 5/2006 | Fossati et al. | |
| 2007/0267018 | A1 | | 11/2007 | Paller | |
| 2008/0105417 | A1 | * | 5/2008 | Deaver | F28D 7/0033 165/164 |
| 2008/0245354 | A1 | * | 10/2008 | Hancock | F24H 3/087 126/116 R |
| 2008/0257336 | A1 | * | 10/2008 | Hancock | F24H 3/087 126/99 R |
| 2012/0125311 | A1 | * | 5/2012 | Grammens | F23N 1/022 126/116 R |

OTHER PUBLICATIONS

International Search Report and Written Opinion in International Patent Application No. PCT/US2016/016222. dated Apr. 21, 2016. Published Aug. 11, 2016. 15 pages.

* cited by examiner

CONVECTION OVEN WITH LINEAR COUNTER-FLOW HEAT EXCHANGER

CROSS-REFERENCE

This application claims priority to U.S. Provisional Patent Application No. 62/111,577, filed Feb. 3, 2015, the entirety of which is incorporated herein by reference.

FIELD OF INVENTION

The current invention relates to convection ovens that circulate heated air through a cooking chamber.

BACKGROUND

Convection ovens circulate heated air in a cooking chamber to distribute heated process air evenly around food product. Some convection ovens generate heat using a flame element. Previously implemented convection ovens using the flame element are typically one of two types: direct-fired or indirect-fired. In direct-fired ovens, the products of combustion produced by the flame element may be vented directly into the process airflow and come in contact with the food in the cooking chamber. In indirect-fired ovens, the products of combustion may be separated from the process airflow and do not contact the food in the cooking chamber. Indirect firing of a convection oven may be preferred in ovens where control of the amount of moisture in the airflow is critical to the quality of the cooking process. The addition of combustion exhaust by a direct-fired method may increase or decrease moisture content and thereby alter the baking or cooking process.

There is an inherent inefficiency in any fuel-fired process due to the need for oxygen in the combustion process. Oxygen is nearly always supplied by ambient air, which may be at or around ambient temperature. A portion of the energy supplied by the fuel is utilized to heat the oxygen and the associated air, which is mostly inert in the combustion process. Inefficiency is compounded when the process temperatures are elevated, such as in baking and cooking ovens where the process air may be between 150° C. and 250° C. above ambient temperature. In such cases, inefficiency is at least partially a result of the energy required to heat air used for combustion from ambient temperature to a temperature above the desired cooking process temperature.

Previously implemented solutions have addressed the issue of combustion inefficiency by improving the effectiveness of the heat transfer from the combustion process to the process air. Some solutions have used "crossflow" where the flame, products of combustion and exhaust are ducted transversely to the flow of process air to increase the heat transfer efficiency. Other solutions have used "cross counter-flow" where the flow of flame, products of combustion and exhaust are ducted transversely to the flow of process air in successive passes progressing in a direction counter to the flow of process air. Although the previously implemented solutions have achieved some degree of success, they have failed to fully overcome the physical limitations of space within the conventional size of an oven and the associated cost and difficulty of construction.

DETAILED DESCRIPTION

In convection ovens, the process of heat transfer to the product (often a food product) is by means of convection; the movement of process air A within the oven chamber. The process air A may be heated by various means, including electric heating elements, one or more direct firing burners, or indirectly using a heat exchanger. This application relates to an indirect-fired convection oven and method of distributing heat utilizing a heat exchanger for heating the process air A circulating therein. Transferring heat energy into a food product in a convection oven may be accomplished in a more efficient manner using the convection oven and methods described herein than by previously implemented solutions.

The instant convection oven and methods advance the process of heat transfer over previously implemented solutions by using linear counter-flow, a method not previously employed in convection ovens. In the linear counter-flow method, the flow of heat (e.g., heated fluid F, products of combustion in the heat exchange ducts) is parallel to the flow of process air A (linear), but the flow of heat is in an opposite direction (counter-flow) to the direction in which the process air A flows. This method maximizes the benefits of counter-flow heat exchange.

According to the convection oven disclosed herein, a single heat element (e.g., burner) per heat exchange duct may enhance the benefits over other previously used methods. For example, the single heat element per heat exchange duct of the instant convection oven limits the structural stresses inherent in existing heat exchangers where a single heat element feeds the products of combustion to multiple heat exchange ducts. The previously-implemented single burner to multiple duct heat exchangers typically apply the products of combustion at high temperature onto the materials that form the distribution means to the multiple heat exchange ducts, often referred to as the "duct plate." In contrast, the one-burner-per-duct heat exchanger disclosed herein does not impinge products of combustion on a duct plate and thereby eliminates the structural stress inherent in previous designs.

The linear counter-flow design also efficiently uses space, since the heat exchange duct(s) follow the path of process air A flow, rather than crossing the process air A flow path. In the previous cross counter-flow designs, the heat exchange duct(s) turn in the process air A flow path, either by bending or by means of collection and distribution ducts; both requiring additional space in the convection oven.

Figure 1:
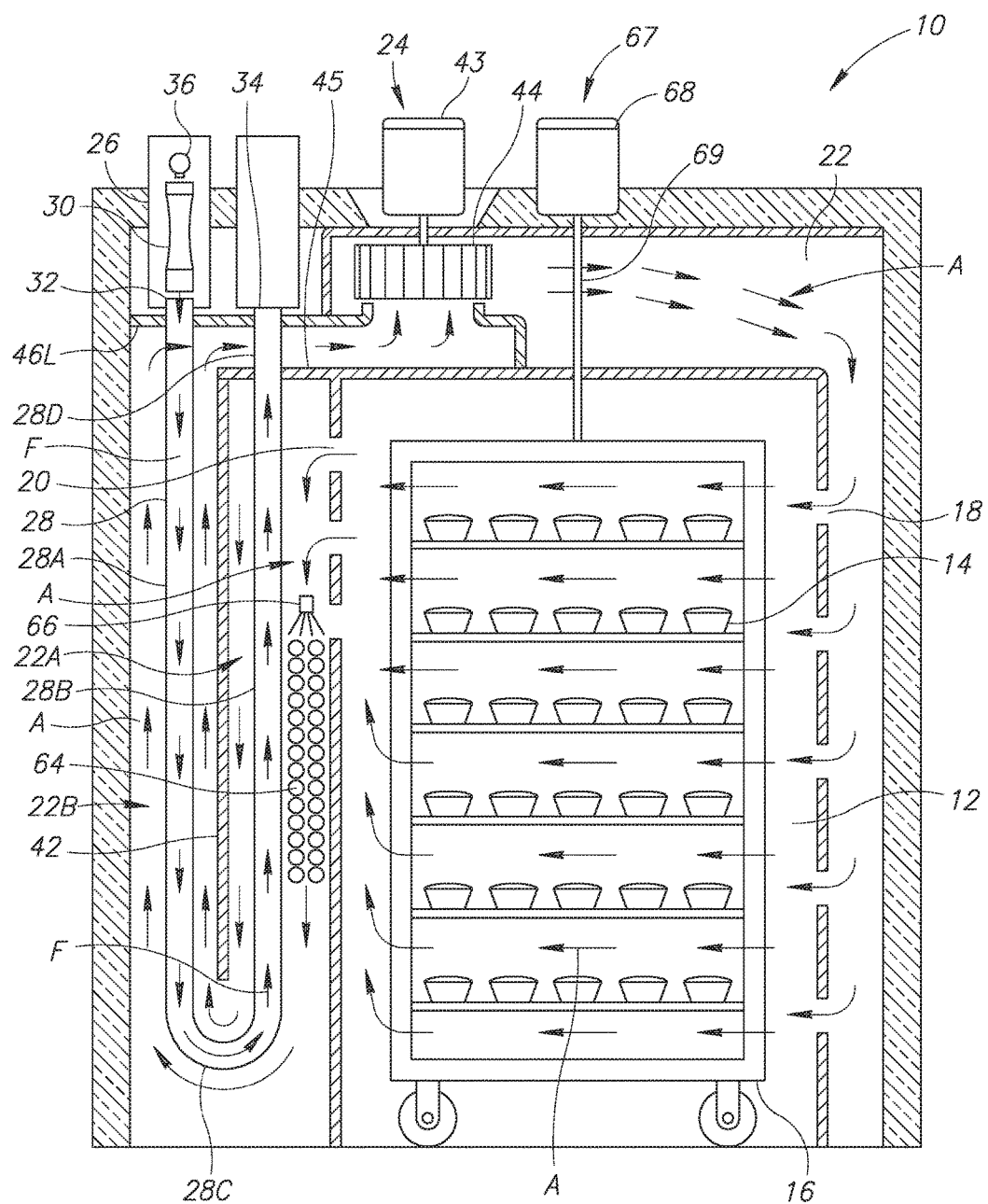
FIG. 1 illustrates a cross-sectional front side view of a convection oven according to a first embodiment.
Figure 2:
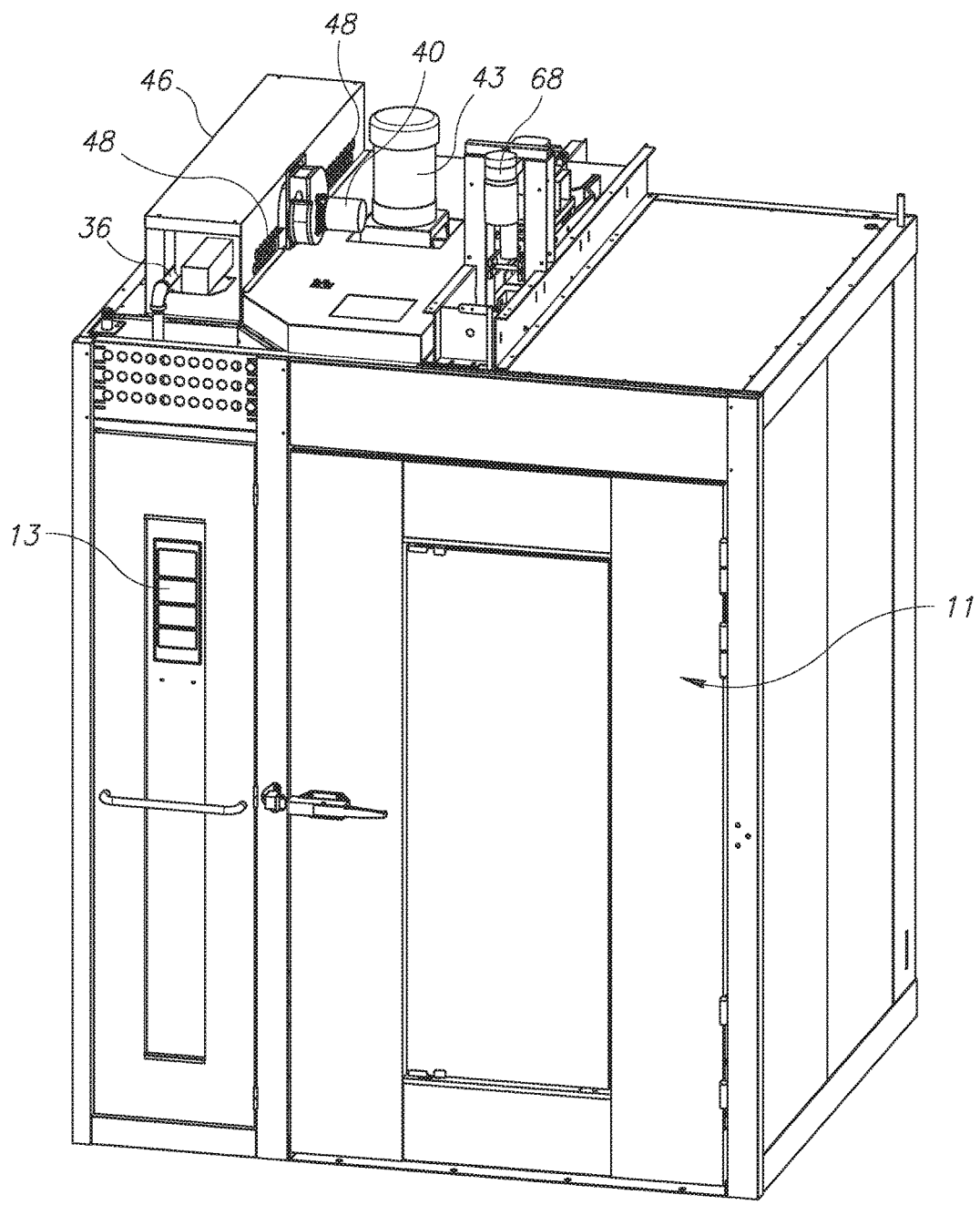
FIG. 2 illustrates a perspective view of the convection oven of FIG. 1.

A convection oven 10 according to a first embodiment is shown in FIG. 1. The convection oven 10 has a cooking chamber 12 for cooking food product 14. The cooking chamber 12 may be sized and shaped to accommodate a rack 16 for holding the food product 14 during cooking. A door 11 (see FIG. 2) on a front of the convection oven 10 may be selectively opened or closed to insert the rack 16. A control panel 13 may be provided on an exterior surface of the convection oven 10 to control various aspects of a cooking process, such as cooking temperature, cooking time, convection characteristics, and rotation of the rack 16, for example. When the convection oven 10 is activated, the convection oven may circulate heated process air A through the cooking chamber 12 to cook the food product 14. The heated process air A enters a process air entrance 18 of the cooking chamber 12, contacts the food product 14, and then exits the cooking chamber through a process air exit 20. The process air A moves along a circulation path in a circulation passage 22 connecting the process air exit 20 toward the process air entrance 18. An air circulator 24 positioned along the circulation passage 22 moves the process air A in a first direction along the circulation path from the process air exit 20 to the process air entrance 18.

A heat exchanger 26 heats the process air A in the circulation passage 22 as the process air moves along the circulation path. The heat exchanger 26 has one or more heat transfer ducts 28 that extend longitudinally along and substantially in parallel with a length of the circulation path in the circulation passage 22. The one or more heat transfer ducts 28 are vertically oriented in the convection oven 10. The one or more heat transfer ducts 28 may be comprised of a material with a relatively high thermal conductivity, such as copper or aluminum.

The first direction is defined as the direction in which the process air A moves along the circulation path through the circulation passage 22 from the process air exit 20 to the process air entrance. In the present embodiment, for example, the first direction is initially downward and substantially in parallel to a partition wall 42 in a first passage portion 22A of the circulation passage 22. The first direction then bends around a distal end of the partition wall 42. In a second passage portion 22B of the circulation passage 22, the first direction is an upward direction and substantially in parallel to the partition wall. The first direction changes to a horizontal direction near the top of the convection oven 10, then changes to a direction following a flow path through the air circulator 24. After the process air A exits the air circulator 24, the first direction is the horizontal direction, then the first direction changes to a downward direction before the process air A enters the process air entrance 18. The first direction may be different in other embodiments depending on the circulation path of the process air A through the circulation passage 22.

One or more heating elements 30 heat a fluid that is circulated through each heat transfer duct 28 in a second direction defined as being opposite to the first direction in which the process air A is moving. In particular, the heated fluid F is circulated from the heating element 30 into a duct inlet 32 at a first end of each heat transfer duct 28. Each heat transfer duct 28 is separately sealed from the circulation passage 22 so that the heated fluid F does not directly contact the process air A circulating along the circulation path or process air A in the cooking chamber 12. The heated fluid F moves through each heat transfer duct 28 substantially in parallel with process air A moving in the first direction along the circulation path. The heated fluid F travels along the entire length of each heat transfer duct 28 and exits from a duct outlet 34 at a second end of each heat transfer duct opposite the first end.

The second direction is defined as the direction in which the heated fluid F flows in the one or more heat exchange ducts 28 exposed in the circulation passage 22 from the duct inlet 32 to the duct outlet 34. In the present embodiment, the second direction is initially downward through the second passage portion 22B. The second direction then bends around the distal end of the partition wall 42. The second direction changes to an upward direction through the first passage portion 22A. The second direction may be different in other embodiments depending on the circulation path of the process air A through the circulation passage 22.

As the heated fluid F moves in the second direction, heat from the heated fluid F is conducted through walls of the one or more heat transfer ducts 28. An outer wall along substantially the entire length of each heat transfer duct 28 is exposed to the process air A. The process air A moving along the circulation path contacts the exposed outer wall of each heat transfer duct 28 and absorbs heat therefrom. The linear counter-flow arrangement of the heated fluid F in the heat transfer duct 28 allows the process air A to absorb more heat than in previously implemented convection ovens, and also exhibits improved heat transfer efficiency over previously implemented convection ovens.

Heat transfer efficiency in an indirect-fired convection oven is, at least in part, a function of the difference in temperature between the heated fluid F in the heat exchanger 26 and the process air A in the circulation passage 22: the greater the temperature difference between the heated fluid F and the process air A, the greater the amount of heat transferred from the heated fluid F to the process air A. A greater temperature difference between the process air A and the heated fluid F is maintained along the length of the one or more heat transfer ducts in the linear counter-flow design than in previously-implemented designs because the temperature of the process air A and the temperature of the heated fluid F both increase in the first direction. That is, the temperature of the heated fluid F in the heat transfer ducts 28 is the greatest at the duct inlet 32 and decreases the farther away the heated fluid F travels from the one or more heating elements 30 (i.e., temperature decreases as the heated fluid F travels in the second direction). Conversely, the temperature of the process air A is at its lowest along the circulation path when exiting the process air exit 20 of the cooking chamber 12, and increases as the process air A travels in the first direction along the length of the one or more heat transfer ducts 28. The linear counter-flow design achieves improved heat transfer efficiency while maximizing available space in a convection oven.

Figure 3:
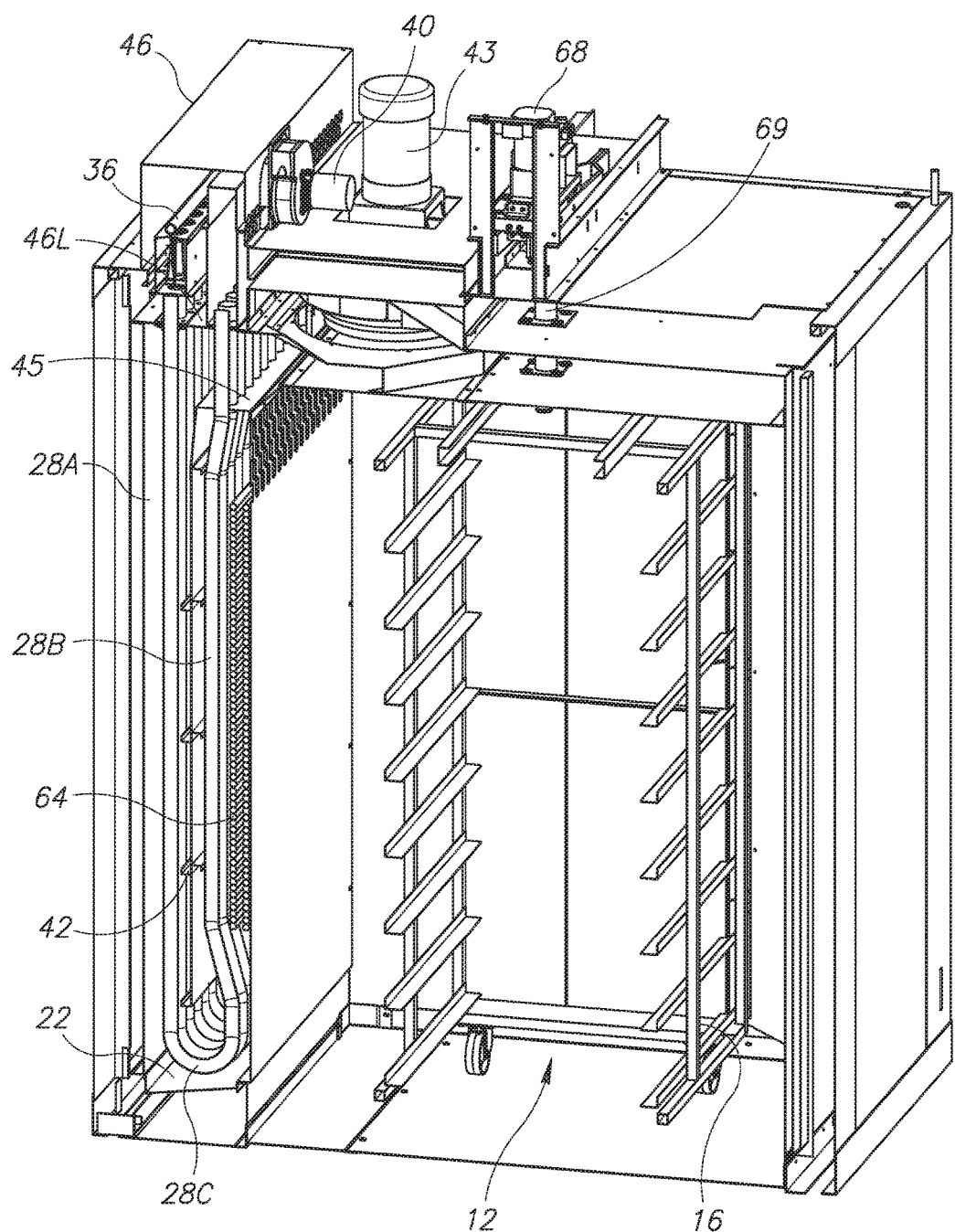
FIG. 3 illustrates a cross-sectional perspective view of the convection oven of FIG. 1.
Figure 4:
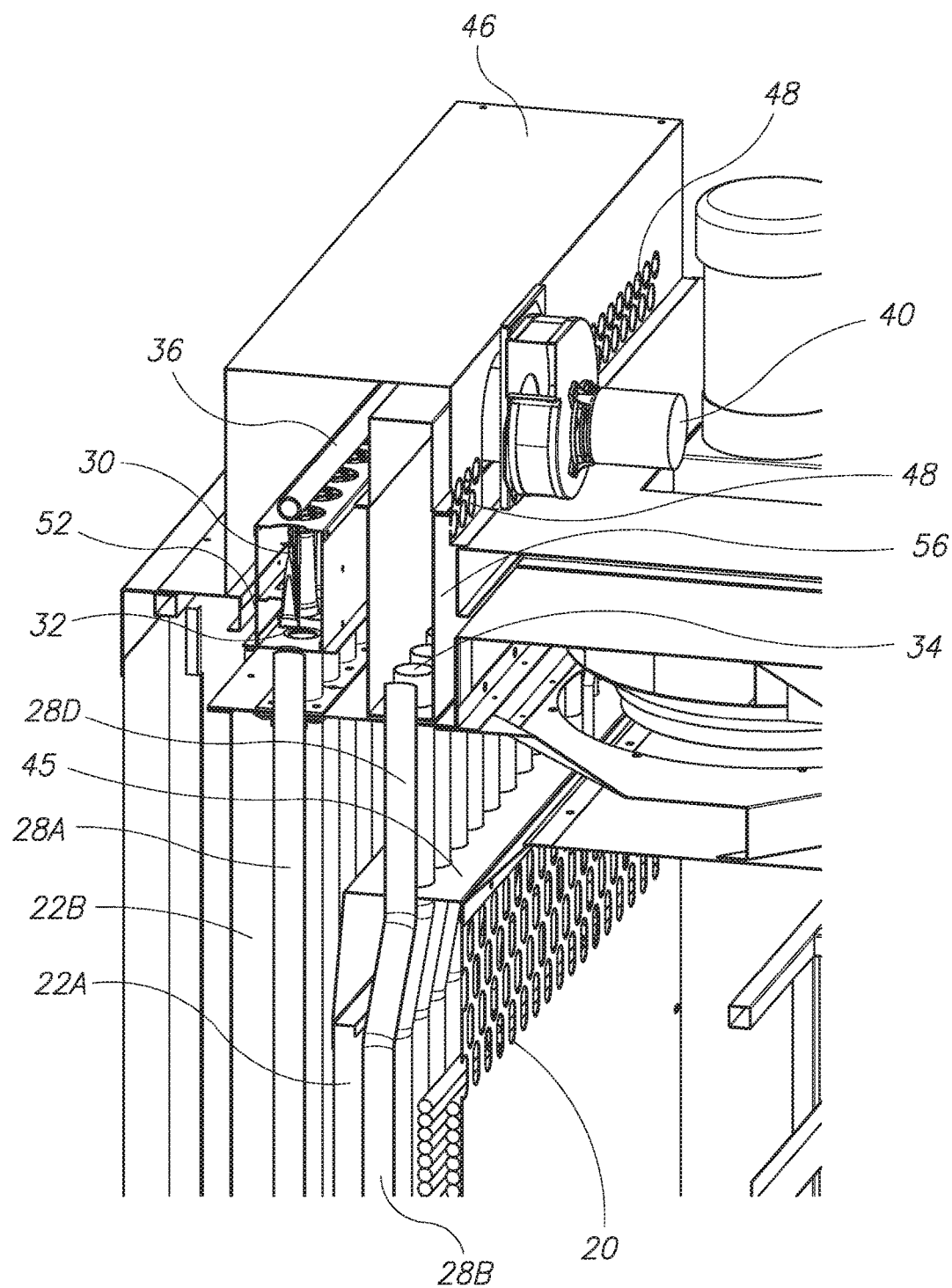
FIG. 4 illustrates a first enlarged cross-sectional perspective view of a heat exchanger housing of the convection oven of FIG. 1.
Figure 5:
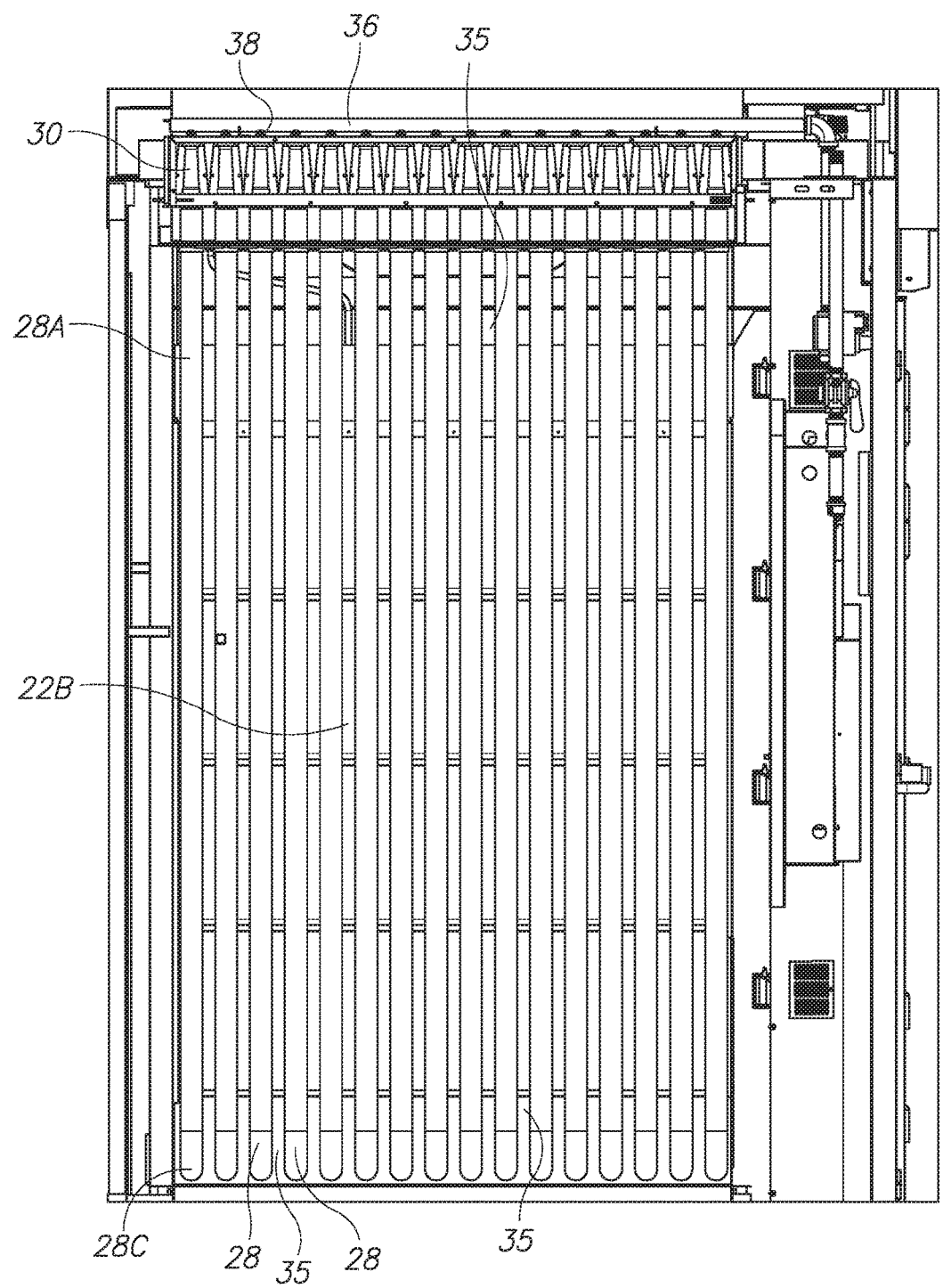
FIG. 5 illustrates a first cross-sectional left side view of the convection oven of FIG. 1.

When there are more than one heat exchange ducts 28, the heat exchange ducts extend in parallel to each other along the circulation passage 22, as shown in FIGS. 3, 4, and 5. The heat exchange ducts 28 are vertically oriented in the circulation passage 22 and arranged from the front to the back of the convection oven 10. Adjacent heat exchange ducts 28 are spaced apart by a gap 35 (see FIG. 5) so that the process air A may contact the entire surface area of the heat exchange ducts exposed in the circulation passage 22. In some embodiments, the heat exchange ducts 28 may be successively arranged from the front to the back of the convection oven 10 without gaps 35 separating the heat exchange ducts 28. The heat exchange ducts 28 may have different orientations or arrangements than those in convection oven 10, as described below.

The one or more heating elements 30 may each include a heat source for creating the heated fluid F. In the present embodiment, each of the one or more heating elements 30 may be a burner that generates a flame for igniting a flammable fluid supplied from a fluid supply manifold 36. Each of the one or more heating elements 30 is adjacent to another of the heating elements such that ignition of one of the heating elements may ignite an adjacent one of the heating elements. Ignition of one of the heating elements 30 may therefore sequentially ignite the remaining heating elements.

A fluid supply port 38 may be provided for and aligned with a corresponding one of the one or more heating elements 30, as shown in FIGS. 4 and 5. Each of the one or more heating elements 30 may be aligned to supply the heated fluid F in a corresponding duct inlet 32 of each heat transfer duct 28. The flammable fluid may be propelled through the fluid supply manifold 36 and expelled from the supply ports 38 using positive pressure (see FIGS. 4 and 6). The flammable fluid is then ignited by the one or more heating elements 30 and projected at least partially as the heated fluid F into the duct inlet 32 of each of the heat transfer ducts 28.

Figure 6:
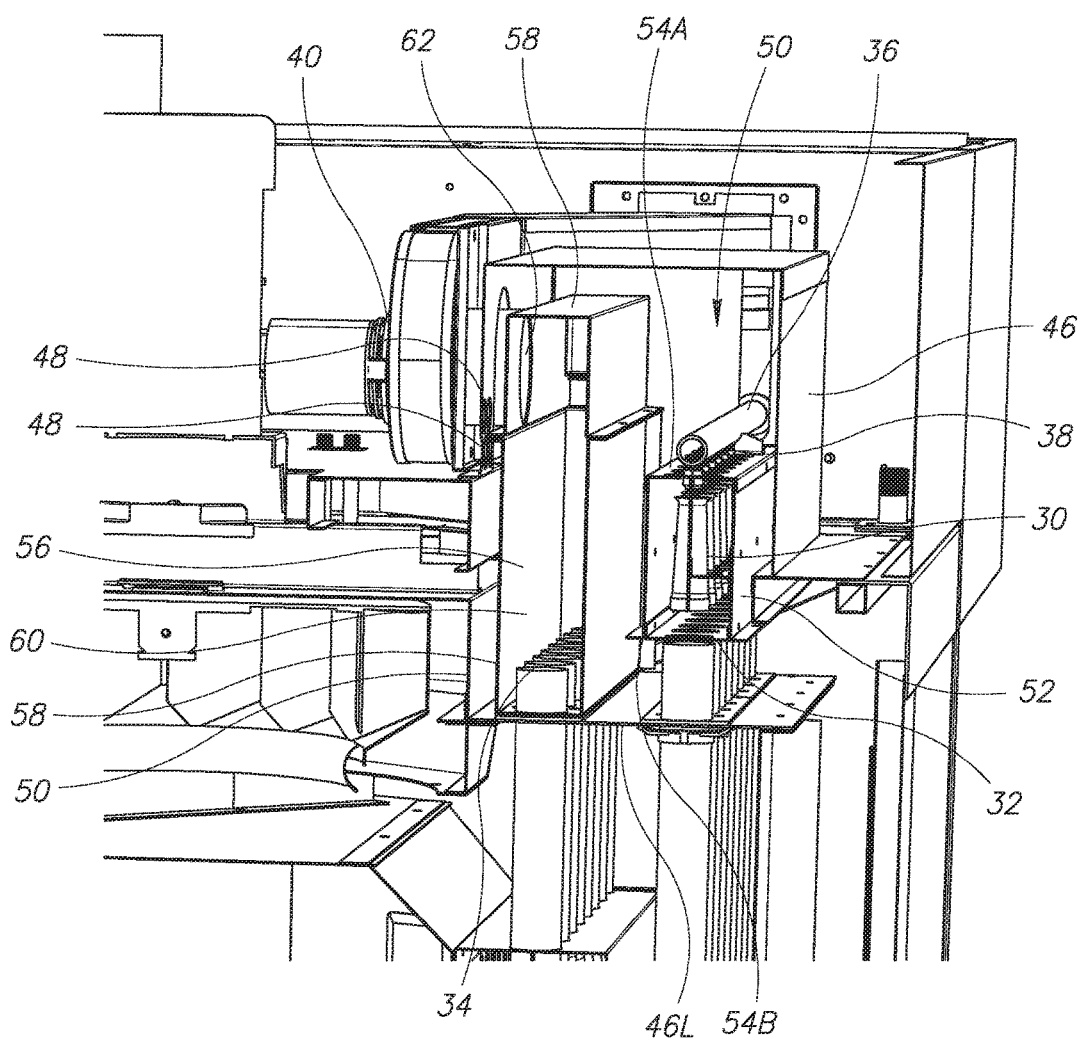
FIG. 6 illustrates a second cross-sectional perspective view of a heat exchanger housing of the convection oven of FIG. 1.

In the present embodiment, the flammable fluid is a flammable gas, such as propane or butane, which is combusted to produce flame or exhaust ("product of combustion") which comprises the heated fluid F. The heated fluid F may be propelled through the entire length of the heat transfer ducts 28 using a fluid circulator 40. The fluid circulator 40 of the present embodiment comprises an exhaust blower or fan connected to a duct outlet 34 side of each heat transfer duct 28 to help draw or pull the heated fluid F therethrough, as shown in FIGS. 4 and 6. In some embodiments, a pump or blower may be provided on a duct inlet 32 side of each heat transfer duct 28, or even in each heat transfer duct itself, to help convey the heated fluid F in the second direction and out of each duct outlet 34. The heated fluid F may be conveyed through each heat transfer duct 28 without using an active fluid circulation element using the positive pressure exerted on the heated fluid F or as a result of natural draft of the heated fluid F itself.

Other fluids and associated systems may be used instead of or in addition to the flammable gas system described above. The heated fluid F may comprise a flammable liquid that is injected through the fluid supply manifold 36 or injected from the supply ports 38 onto the heating elements 30, by way of non-limiting example. In some embodiments, the one or more heating elements 30 may comprise an electric or inductive heating element that heats a non-flammable fluid that is then conveyed through each heat transfer duct 28 in the second direction. Those of ordinary skill in the art will appreciate that there are many systems and fluids that may be implemented to move heated fluid F through each heat transfer duct 28 without departing from the scope of the convection oven described herein.

The air circulator 24 circulates the process air A through the cooking chamber 12 from the process air entrance 18 toward the process air exit 20. The air circulator 24 circulates the process air A out of the process air exit 20 and into the circulation passage 22. The air circulator 24 of the present embodiment is positioned downstream of the one or more heat transfer ducts 28 along the circulation path. The air circulator 24 includes a motor 43 that drives a circulation element 44 about a motor shaft. The circulation element 44 in the present embodiment is a centrifugal fan that accelerates and expels air in a radial direction. The air circulator 24 may have a different circulation element 44 in other embodiments, such as a mechanical fan that accelerates and expels air in an axial direction of rotation, by way of non-limiting example.

The air circulator 24 moves the process air A along the circulation path in the circulation chamber 22 in the first direction from the process air exit 20 and toward the process air entrance 18. As the process air A moves along the first direction in the circulation passage 22, the process air A contacts and absorbs heat from the length of the heat transfer duct 28 exposed in the circulation passage 22 between the process air exit 20 and the process air entrance 18. A first duct portion 28A of the one or more heat transfer ducts 28 is closer to the process air entrance 18 along the circulation path than a second duct portion 28B of the one or more heat transfer ducts 28, which is closer to the process air exit 20 along the circulation path. The process air exit 20 in the present embodiment is located near the top of the cooking chamber 12 and adjacent to the second duct portion 28B. The process air A exiting the process air exit 20 first contacts the second duct portion 28B and then the first duct portion 28A as the process air A moves in the first direction.

In the present embodiment, the partition wall 42 separates the first duct portion 28A of each heat transfer duct 28 and the second duct portion 28B in the circulation passage 22, as shown in FIGS. 1 and 3. The partition wall 42 extends substantially in parallel with the first duct portion 28A and the second duct portion 28B. Each heat transfer duct 28 may have a U-shape or a hairpin-like shape formed with a bent duct portion 28C bending around the distal end of the partition wall 42, which makes the transition of the heated fluid F from the first duct portion 28A to the second duct portion 28B. The partition wall 42 permits creation of an elongated circulation path of the process air A to increase the length and surface area of each heat transfer duct 28 to which the process air A is exposed while traveling along the circulation path and to maximize the amount of heat that the process air absorbs from each heat transfer duct. Each heat transfer duct 28 may additionally include a third duct portion 28D transversely extending through an internal wall 45 and through the circulation passage 22 downstream of the first duct portion 28A in the first direction to provide a return path for the heated fluid F (see FIG. 1). Alternatively, each second duct portion 28B may terminate at the duct outlet 34 without extending through the internal wall 45. For example, each second duct portion 28B may bend and extend into a front or a rear wall of the convection oven 12 near the process air exit 20.

The process air A exiting the process air exit 20 near the top of the cooking chamber 12 first contacts and absorbs heat along the length of the second duct portion 28B. The process air A then absorbs heat from the bent duct portion 28C while traveling around the lower end of the partition wall 42 before contacting and absorbing heat along the length of the first duct portion 28A. Exposing the process air A to the length of the first and second duct portions 28A and 28B and the bent duct portion 28C increases the amount of heat that the process air A absorbs from the heat transfer duct 28 while efficiently utilizing the available space in the convection oven 10. The heated process air A flows through the air circulator 24, through the remaining circulation passage 22, and back into the cooking chamber 12 through process air entrance 18. After the heated process air A circulates through the cooking chamber 12 to heat the food product 14, the heated process air A again exits the cooking chamber 12 from the process air exit 20 and begins traveling along the circulation path through the circulation passage 22 again.

A heat exchanger housing 46 may be positioned at both ends of the one or more heat transfer ducts 28, as shown in FIGS. 1, 3, 4, and 6. The heat exchanger housing 46 has a lower wall 46L having one or more pairs of adjacent apertures for respectively receiving each end of the one or more heat transfer ducts 28. Each pair of adjacent apertures may be closely positioned to each other along the same plane on the lower wall 46L, as shown in FIGS. 1 and 6. The pairs of adjacent apertures are successively arranged from the front to the back of the convection oven 12 to achieve a desired width of the gaps 35. The ends of the one or more heat transfer ducts 28 are closely positioned to provide a compact design that reduces the cost and overall size of the convection oven 10. The lower wall 46L of the heat exchanger housing 46 forms a seal around the one or more heat transfer ducts 28 to help prevent fluid communication between process air A in the circulation passage 22 and heated fluid F in the interior of the heat exchanger housing 46. In the present embodiment, the duct inlet 32 and the duct outlet 34 are positioned above the lower wall 46L of the heat exchanger housing 46, but the duct inlet 32 or the duct outlet 34 may be instead be positioned at the lower wall 46L in other embodiments.

The heat exchanger assembly 46 includes one or more fluid intake ports 48 for receiving the fluid that is heated by the one or more heating elements 30, as shown in FIGS. 4 and 6. The fluid may flow through an intake cavity 50 in an interior of the heat exchanger assembly 46 to reach the one or more heating elements 30 after entering the one or more fluid intake ports 48. The heated fluid F heated by the one or more heating elements 30 enters into the duct inlet 32 of the one or more heat transfer ducts 28. In the present embodiment, the one or more heating elements 30 produce a flame that heats air received through the one or more fluid intake ports 48. Air from the one or more fluid intake ports 48 may be drawn into a heating element assembly 52 having walls that at least partially encloses the one or more heating elements 30. Air may be drawn into the heating element assembly 52 through one or more first ventilation apertures 54A arranged along one or more upper walls of the heating element assembly 52 and combine with the flammable fluid from the supply ports 38 to create an appropriate mixture for igniting the heating element flame(s). The first ventilation apertures 54A or second ventilation apertures 54B may be consecutively arranged in one or more rows. The heating element flame(s) may heat air drawn into one or more second ventilation apertures 54B arranged along one or more lower walls of the heating element assembly 52. The product of combustion (e.g., the air from the one or more fluid intake ports 48, the flame, and flame exhaust) flows enters the duct inlet 32 and circulates through the one or more heating ducts 28. In other embodiments, the heating exchanger assembly 46 may be provided without a heating element assembly 52.

A collecting bin 56 may be positioned at or near the duct outlet 34 of the one or more heat transfer ducts 28 to collect the heated fluid F exiting from the one or more heat exchange ducts 28, as shown in FIGS. 4 and 6. The collecting bin 56 includes bin walls 58 enclosing a collecting cavity 60. One or more of the bin walls 58 may form an interface that separates and seals the heated fluid F in the collecting cavity 60 from the fluid in the intake cavity 50. The interfacing bin walls 58 may be comprised of a material having relatively high heat conductivity, such as aluminum or copper. The heated fluid F flows out of the duct outlet 34 and collects in the collecting cavity 60 after circulating through the entire length of the one or more heat transfer ducts 28. Heat from the heated fluid F collected in the collecting cavity 60 is absorbed by and conducted through the bin walls 58. The fluid in the intake cavity 50 flows along the interface formed by the bin walls 58 on the sides, top, bottom, front, or back of the collecting bin 56. Heat emanating from the bin walls preheats the fluid in the intake cavity 50 before the fluid enters the heating element assembly 52 or interacts with the one or more heating elements 30. This pre-combustion heat transfer from heated fluid F in the collecting bin 56 to fluid in the intake cavity 50 significantly reduces the energy consumed in the combustion process by recovering heat that would be otherwise lost in other designs. The pre-combustion heat transfer may also effectively combust fluids at temperatures below the process air A temperature thereby reducing thermal stresses and the and overall energy required to cook food products 14 in the cooking chamber 12.

In the present embodiment, the heat exchanger 26 heats gas (e.g., ambient air) drawn in from the intake ports 48, but the heat exchanger 26 may heat a liquid in other embodiments. By way of non-limiting example, liquid (e.g., water, oil) may be circulated into the intake cavity 50 and heated by a flame produced by the one or more heating elements 30 before or as the liquid flows into the one or more heat transfer ducts 28. Alternatively, each of the one or more heating elements 30 may include an electric or inductive heating element that heats the liquid flowing into the one or more heat transfer ducts 28. The liquid may be pumped in from an external source or circulated through an external tank connected to the convection oven. The fluid leaving the outlet duct 34 may be expelled from an outlet port 62 of the heat exchange housing 46. In the present embodiment, the fluid circulator 40 is an exhaust blower that helps to expel the product of combustion from the heat exchange housing 46.

A thermal mass 64 may be arranged adjacent to the one or more heat transfer ducts 28 in the circulation passage 22, as shown in FIGS. 1, 3, 8, and 9. The thermal mass 64 is arranged near or adjacent to the process air exit 20 to draw heat from the process air A exiting the cooking chamber 12 before the process air is significantly heated by the one or more heat exchange ducts 28. The thermal mass 64 may be used to generate steam for assisting in the cooking process and to reduce the temperature of the process air A before the process air contacts much of the one or more heat transfer ducts 28. The thermal mass 64 is positioned to draw heat from the process air A leaving the cooking chamber 12 so that process air A initially contacting the one or more heat transfer ducts 28 near the process air exit 20 is at the lowest temperature in the circulation path. The thermal mass 64 may effectively produce steam even at the lowest temperature in the circulation path because water may evaporate at temperatures below the temperature of the process air A entering the process air entrance 18 of the cooking chamber 12. The position of the thermal mass 64 increases the efficiency of the convection oven 10 because the thermal mass may draw heat from the one or more heat transfer ducts 28 even if the temperature of the thermal mass is lower than the temperature required to cook the food product 14.

Figure 7:
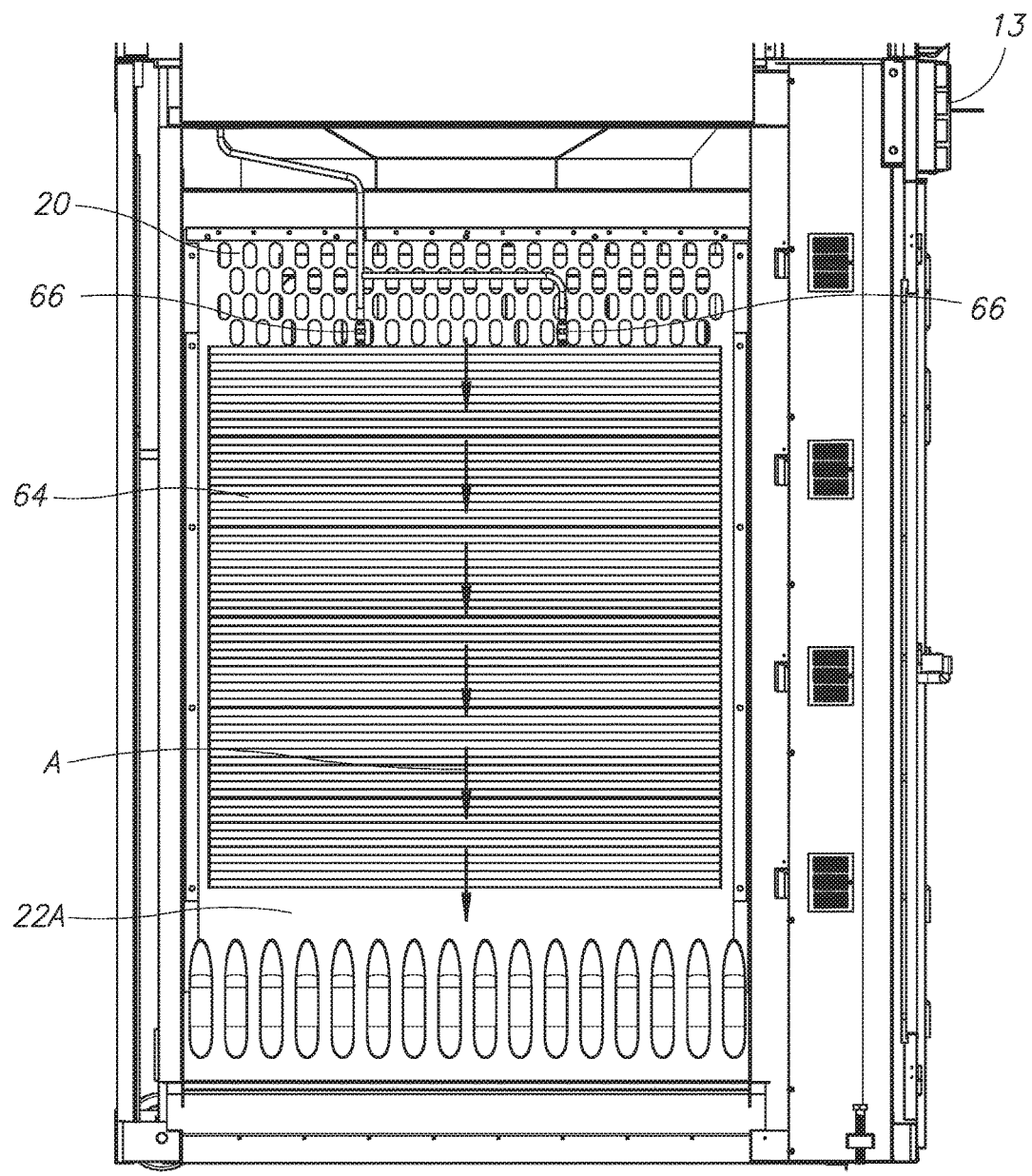
FIG. 7 illustrates a second cross-sectional left side view of the convection oven of FIG. 1.

The thermal mass 64 may be arranged in parallel to the one or more heat exchange ducts 28 along the circulation path in the circulation passage 22. The thermal mass 64 may comprise one or more rows of bars or rods each extending between a front side and a back side of the convection oven 10, as shown in FIG. 7. One or more sprayers 66 may spray water onto the thermal mass 64 to generate steam in the circulation passage 22. The one or more sprayers 66 may be located above or upstream of the thermal mass 64 in the circulation path of the circulation passage 22 to help evenly distribute the water over the thermal mass.

The convection oven 10 may include a rack rotating device 67 (see FIGS. 1 and 2) positioned above the rack 16 and configured to rotate the rack in the cooking chamber 12. The rack rotating device 67 includes a motor 68 that rotates a downwardly extending shaft 69. The shaft 69 rotates the rack 16 during a cooking process to promote even distribution of the heated process air A over the food product 14. A distal end of the shaft 69 may engage with the rack 16 using an attachment feature to allow the rack to rotate with the shaft. The attachment feature may be a formed shape, channel or plate affixed to the shaft 69 that interlocks with formed shapes or channels affixed to the top of the rack 16. In some embodiments, the rack rotating device 67 may attach to and lift the rack 16 upwards using a flange disposed near the distal end of the shaft 69. The flange on the distal end may engage underneath a portion of the rack 16 to help lift the rack 16. The attachment feature is not particularly limited and may be any feature known by those of ordinary skill in the art, including a clamp, a hook, or a loop, by way of further non-limiting example. The control panel 13 may be operated to control operation aspects of the rack rotating device 67, such as lift, rotation speed, and rotation duration, for example.

Figure 8:
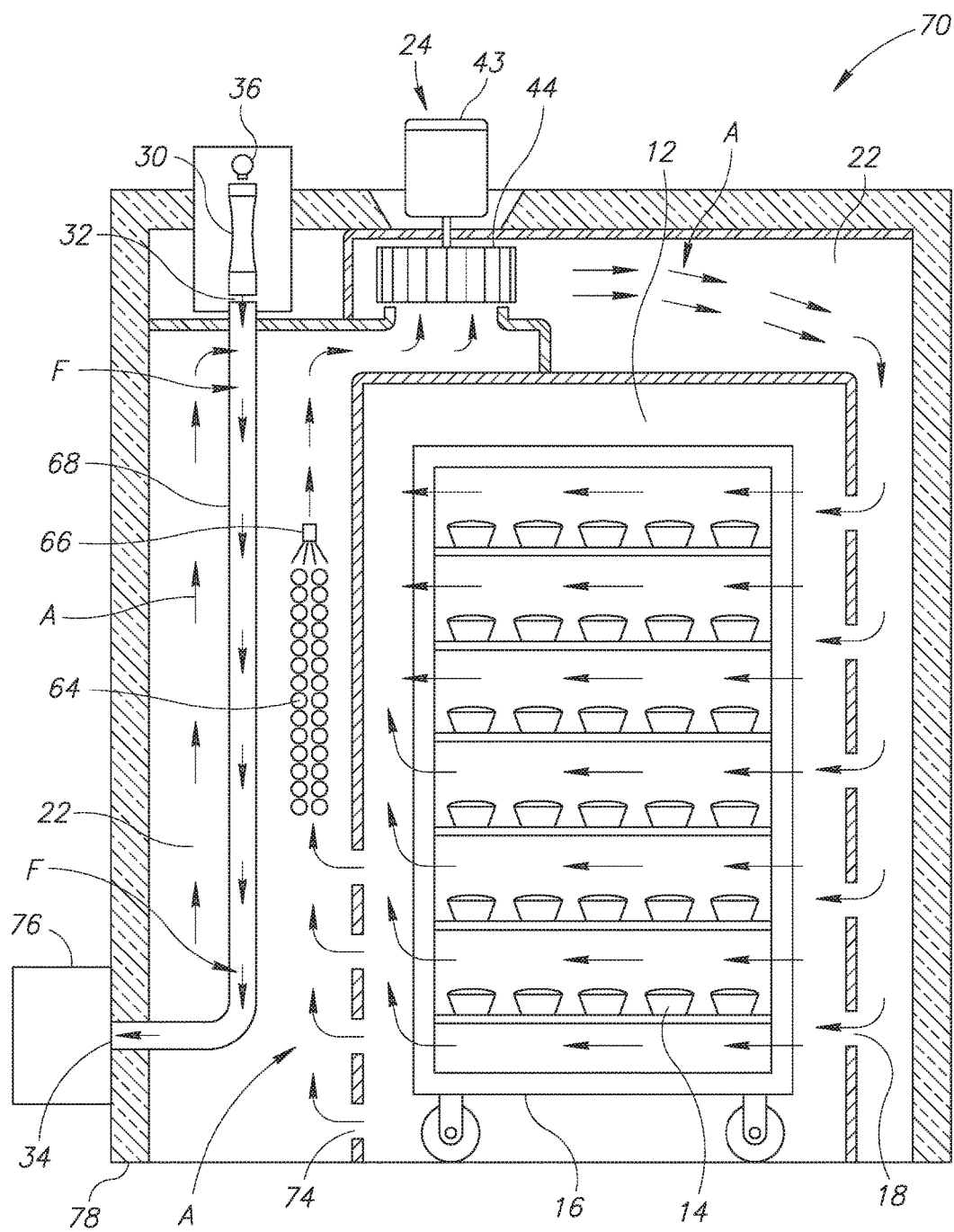
FIG. 8 illustrates a cross-sectional front side view of a convection oven according to a second embodiment.

The convection oven 10 may have a different heat exchanger configuration than the heat exchanger 26 shown in FIGS. 1 and 3. In another embodiment, a convection oven 70 is provided with one or more heat transfer ducts 68 linearly extending through the circulation passage 22 and which do not have a U-shape or hairpin-like shape, as shown in FIG. 8. The process air A exits through a process air exit 74 located near the bottom of the cooking chamber 12. The process air A moves in a first direction (i.e., upward) along the axial length of one or more heat transfer ducts 68. The heated fluid F enters the duct inlet 32 and travels through the one or more heat transfer ducts 68 in a second direction opposite to the first direction (i.e., downward). The one or more heat transfer ducts 68 heat the process air A moving along the circulation path in the circulation passage 22. The one or more heat transfer ducts 68 are arranged in parallel to one another and extend substantially in parallel to the circulation path in the circulation passage 22.

The heated fluid F exits from the duct outlet 34 at an end of the one or more heat transfer ducts 68 opposite the duct inlet 32. The duct outlet 34 may be connected to an outlet assembly 76 for disposing of or recycling the heated fluid F. The one or more heat transfer ducts 68 may bend in the circulation passage 22 to convey the heated fluid F through an exterior wall 78 of the convection oven 10 and into the outlet assembly 76. Alternatively, the outlet assembly 76 may be provided at least partially in the circulation passage 22 to receive heated fluid F exiting the one or more heat transfer ducts 68.

Figure 9:
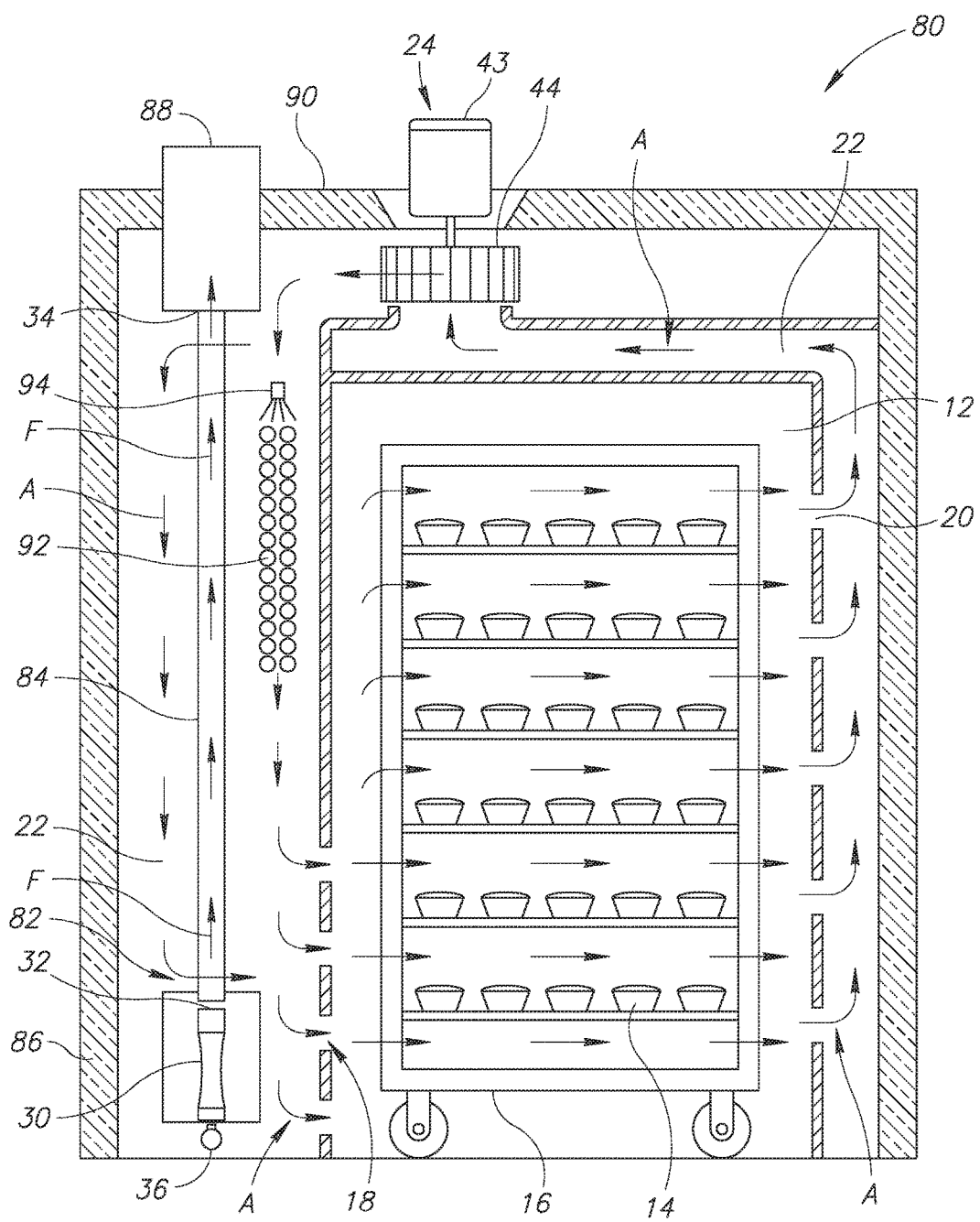
FIG. 9 illustrates a cross-sectional front side view of a convection oven according to a third embodiment.

In a further embodiment, a convection oven 80 may have a heat exchanger 82 adjacent to the process air entrance 18 of the cooking chamber 12, as shown in FIG. 9. The process air entrance 18 may be provided near the one or more heat transfer ducts 84 extend linearly and substantially in parallel to the circulation path of the process air A in the circulation passage 22. The process air A is circulated along the circulation path in the circulation passage 22 in the first direction from the process air exit 20 toward the process air entrance 18 disposed near the bottom of the convection oven 80. The air circulator 24 in the convection oven 80 is disposed upstream of the one or more heat transfer ducts 84 along the circulation path. After the process air A circulates through the air circulator 24, the process air A moves in a first direction (i.e., downward) toward the process air entrance 18 near the bottom of the cooking chamber 12. The heated fluid F flows into each duct inlet 32 and through the one or more heat transfer ducts 84 in the second direction opposite to the first direction (i.e., upward in a counter-flow direction). The linearly extending heat transfer ducts 84 do not have a U-shape or hairpin-like shape.

The one or more heating elements 30 are mounted near the bottom of the convection oven 80. In the present embodiment, the one or more heating elements 30 are vertically oriented and disposed in the circulation passage 22. In some embodiments, the one or more heating elements 30 may be horizontally oriented and disposed in or extending through a side wall 86 of the convection oven 80. In further embodiments, the one or more heat transfer ducts 84 may extend through apertures on the side wall and connect to the one or more heating elements 30 disposed on an exterior surface of the side wall 86. When the one or more heating elements 30 are not vertically oriented, each of the one or more heat transfer ducts 84 may have a bent portion near the bottom of the convection oven 80 to connect each duct inlet 32 to a respective one of the heating elements 30.

The heated fluid F flows in the second direction through the one or more heat transfer ducts 84 and exits through the duct outlet 34 near the top of the convection oven 80. The duct outlet 34 may be connected to an outlet assembly 88 near the top of the convection oven 80. In the present embodiment, the duct outlet 34 is connected to the outlet assembly 88 in the circulation passage 22. In other embodiments, the one or more heat transfer ducts 84 may extend through an upper wall 90 or upper portion of the side wall 86 to connect the duct outlet 34 to the outlet assembly 88 disposed outside of the circulation passage 22.

A thermal mass 92 is adjacent to the one or more heat transfer ducts 84 near the top of the convection oven 80 in the circulation passage 22. The thermal mass 92 helps to draw heat from the process air A before the process air A is significantly heated by the one or more heat transfer ducts 84. The thermal mass 92 may be used to generate steam for assisting in the cooking process and to reduce the temperature of the process air A before the process air A contacts the one or more heat transfer ducts 84. The thermal mass 92 may have a substantially identical configuration to the thermal mass 64 in other respects. The thermal mass 92 increases the efficiency of the convection oven 80 in a similar manner as the thermal mass 64 in the convection oven 10. One or more sprayers 94 may be provided adjacent to the thermal mass 92 to spray water onto the thermal mass 92 to generate steam in the circulation passage 22.

Other configurations of a convection oven may be implemented without departing from the scope of the linear counter-flow design described herein. By way of non-limiting example, one or more heat transfer ducts may be horizontally oriented in a portion of the circulation passage 22 above the cooking chamber 12 of a convection oven. Alternatively, the one or more heat transfer ducts 28/68/84 may be L-shaped with a first vertically oriented portion adjacent to the process air entrance 18 or the process air A exit, and a second horizontally oriented portion in a portion of the circulation passage above the cooking chamber. The heat exchanger 26 and partition wall 42 of the convection oven 10 may be disposed on a process air entrance 18 side of the circulation passage 22 instead of on a process air exit 20 side of the circulation passage.

Various embodiments of the invention are described above in the detailed description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s).

The foregoing description of various embodiments of the invention known to the applicant at the time of filing the application has been presented and is intended for the purposes of illustration and description. The present description is not intended to be exhaustive nor limit the invention to the precise form disclosed and many modifications and variations are possible in the light of the above teachings. The embodiments described serve to explain the principles of the invention and its practical application and to enable others skilled in the art to utilize the invention in various embodiments and with various modifications as are suited to the particular use contemplated. Therefore, it is intended that the invention not be limited to the particular embodiments disclosed for carrying out the invention.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.).

What is claimed is:

1. A convection oven comprising:
   a cooking chamber having a process air entrance and a process air exit;
   a circulation passage connecting the process air entrance and the process air exit;
   an air circulator configured to move process air along a circulation path through the circulation passage in a first direction from the process air exit to the process air entrance, and configured to circulate process air through the cooking chamber; and
   a heat exchanger including one or more heat transfer ducts longitudinally arranged in the circulation passage along the circulation path, each of the one or more heat transfer ducts being separately sealed from the cooking chamber and the circulation passage, one or more heating elements configured to heat a fluid in the one or more heat transfer ducts, the heat exchanger configured to move the heated fluid through the one or more heat transfer ducts in a second direction opposite to the first direction, wherein each of the one or more heat transfer ducts includes a bent portion disposed between and connecting a first duct portion of the heat transfer ducts and a second duct portion of the heat transfer ducts, the second duct portion being closer to the process air exit along the circulation path than the first duct portion, and wherein each of the one or more heat transfer ducts includes a third duct portion extending from the second duct portion and terminating at a duct outlet from which the heated fluid is removed from the heat transfer duct, the third duct portion being positioned downstream in the first direction of the first duct portion in the circulation path.

2. The convection oven of claim 1, wherein each of the first duct portion receives the heated fluid from the heating element, the first duct portion extending in parallel with and extending along the circulation path, and the second duct portion extending in parallel with and extending along the circulation path, the second duct portion being positioned upstream of the first duct portion in the first direction along the circulation path, and the second duct portion being spaced apart from the first duct portion.

3. The convection oven of claim 2, wherein the first duct portion of each of the one or more heat transfer ducts has a duct inlet into which the heated fluid enters from the heating element.

4. The convection oven of claim 2, wherein the first duct portion is closer to the process air entrance along the circulation path than the second duct portion.

5. The convection oven of claim 4, wherein the first duct portion is positioned adjacent to the process air entrance in the circulation passage.

6. The convection oven of claim 1, wherein the second duct portion is positioned adjacent to the process air exit in the circulation passage.

7. The convection oven of claim 1, wherein the heat exchanger includes a plurality of heating elements, and the heat exchanger includes a plurality of heat transfer ducts, each heat transfer duct having a duct inlet into which the heated fluid enters from a corresponding one of the plurality of heating elements.

8. The convection oven of claim 7, wherein each heating element of the plurality of heating elements is arranged adjacent to another of the heating elements of the plurality of heating elements such that ignition of one heating element ignites an adjacent one of the heating elements.

9. The convection oven of claim 1, wherein each of the one or more heat transfer ducts further comprises a duct inlet that receives the heated fluid from at least one of the one or more heating elements and a duct outlet from which the heated fluid is removed.

10. The convection oven of claim 9, further comprising:
    a fluid circulator configured to circulate the heated fluid through the one or more heat transfer ducts, the fluid circulator being connected at a duct outlet side of the one or more heat transfer ducts.

11. The convection oven of claim 9, further comprising:
    a fluid circulator configured to circulate the heated fluid through the one or more heat transfer ducts, the fluid circulator being connected at a duct inlet side of the one or more heat transfer ducts.

12. The convection oven of claim 1, further comprising a thermal mass adjacent to the one or more heat transfer ducts in the circulation passage along the circulation path, the thermal mass being configured to absorb heat from the process air in the circulation passage.

13. The convection oven of claim 12, wherein the thermal mass is positioned adjacent to the process air exit of the cooking chamber.

14. The convection oven of claim 12, wherein the thermal mass is positioned adjacent to the process air entrance of the cooking chamber.

15. The convection oven of claim 12, further comprising a liquid sprayer configured to spray liquid onto the thermal mass to generate steam when the thermal mass absorbs heat from the process air.

16. The convection oven of claim 1, wherein the heat exchanger further includes an outlet port from which at least some of the heated fluid is removed from the heat exchanger, a collection chamber arranged between a duct outlet of the one or more heat transfer ducts and the outlet port and configured to collect the heated fluid removed from the one or more heat transfer ducts, and a fluid inlet that receives the fluid to be heated by the one or more heating elements, wherein the collection chamber is positioned to transfer heat from the heated fluid therein to the fluid inlet to preheat the fluid received in the fluid inlet before the one or more heating elements heat the fluid entering the fluid inlet.

17. The convection oven of claim 16, wherein the collection chamber includes a chamber wall that contacts the fluid received in the fluid inlet and radiates heat from the heated fluid in the collection chamber to heat the fluid received in the fluid inlet.

18. The convection oven of claim 1, wherein the one or more heat transfer ducts comprise a plurality of heat transfer ducts arranged substantially in parallel arrangement with each other.

19. The convection oven of claim 1, wherein the circulation passage has an air heating section located between the cooking chamber and the air circulator, the one or more heat transfer ducts being arranged along the air heating section.

20. The convection oven of claim 1, further comprising a partition wall in the circulation passage, wherein the first duct portion is separated from the second duct portion by the partition wall.

21. The convection oven of claim 20, wherein the partition wall extends in parallel to the first duct portion and the second duct portion.

22. The convection oven of claim 1, wherein the third duct portion is transversely arranged across the circulation passage.

23. The convection oven of claim 1, wherein the one or more heat transfer ducts retain the heated fluid therein isolated from direct contact with the process air.

24. The convection oven of claim 1, wherein each of the bent portion of each of the one or more heat transfer ducts has a substantially U-shape.

25. The convection oven of claim 1, wherein the convection oven further comprises:
a rack rotating device configured to rotate a shaft extending into the cooking chamber, the shaft having a distal end configured to attach to a rack in the cooking chamber.

26. The convection oven of claim 1, wherein the one or more heat transfer ducts are vertically oriented in the circulation passage.

27. The convection oven of claim 1, further comprising:
a partition wall separating a first passageway section of the circulation passage from a second passageway section of the circulation passage, the first passageway section being downstream from the second passageway section along the circulation path; and
wherein for each of the one or more heat transfer ducts the first duct portion is longitudinally extending along the circulation path in the first passageway section and the second duct portion is longitudinally extending along the circulation path in the second passageway section.

28. The convection oven of claim 27, wherein the partition wall terminates at a distal end and the bent portion of each of the one or more heat transfer ducts bends around the distal end of partition wall and connects together the first and second duct portions of the heat transfer duct.

29. The convection oven of claim 27, wherein the partition wall extends in a direction substantially parallel to the first duct portion and the second duct portion of each of the one or more heat transfer ducts.

30. The convection oven of claim 27, further comprising:
a fluid circulation element configured to move the heated fluid from the first duct portion to the second duct portion of the one or more heat transfer ducts in a second direction opposite to the first direction.

31. The convection oven of claim 30, the heat exchanger further comprising a heat exchanger housing containing the one or more heating elements and the fluid circulation element, and the one or more heat transfer ducts include a duct inlet disposed at a first end of the one or more heat transfer ducts and a duct outlet disposed at a second end of the one or more heat transfer ducts, and the first end and the second end of the one or more heat transfer ducts being connected to the heat exchanger housing.

32. The convection oven of claim 1 further comprising:
a thermal mass positioned adjacent to the cooking chamber along the circulation path, the thermal mass configured to absorb heat from the process air; and
a fluid circulation element configured to move the heated fluid through the one or more heat transfer ducts in the second direction opposite to the first direction.

33. The convection oven of claim 32, wherein the thermal mass is disposed between the one or more heating elements and the cooking chamber in the circulation passage.

34. The convection oven of claim 32, wherein the thermal mass is adjacent to the process air exit of the cooking chamber.

* * * * *